(12) United States Patent
Burgess et al.

(10) Patent No.: US 10,859,399 B2
(45) Date of Patent: Dec. 8, 2020

(54) METHOD AND APPARATUS FOR MAGNETICALLY SENSING THE POSITION OF A MAGNETIC TARGET

(71) Applicant: Standex International Corporation, Salem, NH (US)

(72) Inventors: Andrew Burgess, Plymouth, MA (US); Hayden Fletcher, Saint Clairsville, OH (US); Alexander S. Vinnage, Loveland, OH (US)

(73) Assignee: Standex International Corporation, Salem, NH (US)

( * ) Notice: Subject to any disclaimer, the term of this patent is extended or adjusted under 35 U.S.C. 154(b) by 193 days.

(21) Appl. No.: 16/002,094

(22) Filed: Jun. 7, 2018

(65) Prior Publication Data

US 2018/0364067 A1    Dec. 20, 2018

Related U.S. Application Data

(60) Provisional application No. 62/520,096, filed on Jun. 15, 2017.

(51) Int. Cl.
*G01D 5/12*    (2006.01)
*G01F 23/72*    (2006.01)
*G01D 5/14*    (2006.01)

(52) U.S. Cl.
CPC .............. *G01D 5/12* (2013.01); *G01D 5/145* (2013.01); *G01F 23/72* (2013.01)

(58) Field of Classification Search
CPC ........... G01D 5/12; G01D 5/145; G01F 23/72
See application file for complete search history.

(56) References Cited

U.S. PATENT DOCUMENTS

| | | | |
|---|---|---|---|
| 2002/0077752 A1* | 6/2002 | Burreson | G01D 5/251 701/300 |
| 2003/0102860 A1* | 6/2003 | Haji-Sheikh | G01D 5/2451 324/174 |
| 2004/0070390 A1 | 4/2004 | Lamb et al. | |
| 2004/0183526 A1* | 9/2004 | Galbreath | G01D 5/145 324/207.2 |
| 2011/0137589 A1 | 6/2011 | Leskowitz et al. | |
| 2014/0247040 A1* | 9/2014 | Reitsma | G01D 5/202 324/207.15 |
| 2015/0028859 A1* | 1/2015 | May | G01D 5/145 324/207.15 |
| 2016/0025886 A1* | 1/2016 | San Martin | G01V 3/34 702/7 |
| 2016/0097630 A1 | 4/2016 | Lombard et al. | |
| 2016/0139230 A1* | 5/2016 | Petrie | G01R 31/2884 324/225 |
| 2017/0291640 A1* | 10/2017 | Fujita | B62D 5/049 |

FOREIGN PATENT DOCUMENTS

WO    2006076968 A1    7/2006

* cited by examiner

*Primary Examiner* — Francis C Gray
(74) *Attorney, Agent, or Firm* — Saxton & Stump LLC (57) ABSTRACT

A magnetic sensing apparatus for sensing and tracking the position of a target that is independent of the rotation of the target about the magnetic sensing elements. The apparatus provides increased resolution and increased sensor element to sensor element spacing. Also, the apparatus reduces the susceptibility to external interference from interaction with external magnetic fields.

13 Claims, 7 Drawing Sheets

TOP VIEW

TRIMETRIC VIEW

METHOD AND APPARATUS FOR MAGNETICALLY SENSING THE POSITION OF A MAGNETIC TARGET

This application claims benefit of U.S. Provisional Application Ser. No. 62/520,096 filed Jun. 15, 2017, pursuant to 35 USC § 119(e).

FIELD OF THE INVENTION

This invention relates to magnetic sensing, in particular, locating and tracking magnetic targets.

BACKGROUND OF THE INVENTION

The use of magnetic sensing elements is well known in the art for locating and tracking magnetic targets. A particularly ubiquitous application is the use of magnets to determine the level of liquid within a vessel.

Representative of this type of structure is disclosed in U.S. Pat. No. 4,589,282 issued to Dumery on May 20, 1986. This device teaches the use of a large number of equally spaced Hal sensors to form a column. The sensors are mounted on a column wherein each sensor is a packaged integrated circuit with a Hal cell connected with a Schmitt Trigger Circuit.

The Hal sensors are activated one at a time, sequentially. By counting the number of Hal sensors scanned, a rough measure of the liquid level is obtained. The magnetic field regions are spaced apart by a distance that is not equal to the Hal sensor spacing so that a pattern of Hal sensor output voltages provides a vernier measure of the liquid level that is added to a rough measure of the previously obtained rough measure.

Another such device that is similar to the aforementioned one is disclosed in U.S. Pat. No. 8,549,911 issued to Rudd et. Al. on Oct. 8, 2013. This device uses a set of axially displaced magnetic sensing switches with a float having a magnet that rises and falls as the liquid level changes. The magnetic switches are configured so that as the float moves, a new switch is activated before the previously activated switch is deactivated. An electronic circuit provides an output that corresponds to the liquid level. It is noted that this design could be implemented using reed switches and a resistive ladder.

Still another variation of this theme is disclosed in U.S. Pat. No. 9,355,149 issued to Stark on May 10, 2016. This device is a displacement sensor for measuring a position of a magnet relative to the position of a reference point. The magnet is moved along a displacement axis adjacent to a sequence of magnetic field sensors.

The magnetic field sensors are arranged so that the magnetic field of an adjacent sensor has a magnetic field that overlaps one another. The overlap range between two displacement measurement ranges of adjacent magnetic field sensors is selected in such a manner that the total error of the position signal formed by the position signal by a calculation unit in that overlap range is smaller than a maximum tolerable error.

This type of device preferably using Hal sensors is used for controlling machine tools, in automation technology, robotics and in the automotive sector. In comparison to optical methods, Hal sensors are less sensitive to dirt and damage because they can be enclosed hermetically with a non-magnetic casing.

Another variation of this type of device is disclosed in Patent Publication No. WO2006076968 invented by Ray Burke which features a position locating device. Typically, the device is a fluid level sensor having a Halbach magnet assembly associated with a float on the surface of the liquid level that is to be measured and a Hal sensor wherein the Halbach assembly is rotatable relative to the Hal sensor such that the relative angle between the two is measured and provides a signal corresponding to the angle and, thus, provides the liquid level.

Finally, another variation disclosed in Patent Publication No. WO198801046 invented by Morris Suntop is another variant of a liquid level sensor using parts similar to those disclosed in the '968 application.

Prior art makes use of a multitude of single and multi-axis sensing elements, however, there are no references to such sensing devices using a specific sensor orientation in conjunction with a magnet array that creates a continuous and uniform magnetic field which, when coupled to the sensor, provide increased resolution, increased sensor element to sensor element spacing, and reduced susceptibility to external interference from interaction with external magnetic fields.

There is not found in the prior art, a method and an apparatus for tracking a magnetic target that is independent of the rotation of the magnetic target about the magnetic sensing elements, wherein the magnetic sensing elements are oriented to provide the greatest sensitivity relative to a magnetic field produced by the magnetic target; that provides increased resolution and provides increased sensor element to sensor element spacing.

SUMMARY OF THE INVENTION

It is an aspect of the invention to provide an apparatus for making a sensor for tracking a magnetic target.

It is another aspect of the invention to provide an apparatus comprising one or more magnetic field sensing devices and a magnetic target made up of elements that are structured and arrayed to provide a uniform flux field zone.

It is still another aspect of the invention to provide an apparatus for high-resolution tracking of a magnetic target with immunity to magnetic target rotation about an axis that is coincident and/or parallel to the array of sensing elements.

It is another aspect of the invention to provide a sensing apparatus for providing increased resolution and increased immunity to external magnetic interference.

It is still another aspect of the invention to provide a sensing apparatus comprising an arrangement of one or more permanent magnets which produce a known and predictable magnetic field (with respect to both direction and strength) for providing the determination of the position of said magnets using any magnetic sensing technology.

It is another aspect of the invention to provide a sensing apparatus that comprises a magnetic target consisting of a single permanent magnet; 2 or more diametrically opposed permanent magnets; 4 or more magnets arrayed in a Halbach mangle or 4 or more magnets where the magnets are diametrically opposed and 'stacked' in groups of 2 or more diametrically opposed magnet groups; all for providing a uniform magnetic field around or near the sensing elements.

It is another aspect of the invention to provide a sensor apparatus comprising a magnetic target consisting of one or more electromagnets or electromagnetic coils.

Finally, It is another aspect of the invention to provide a sensor apparatus comprising one or more 3D magnetic sensing elements that are oriented such that their axes of sensitivity are at a 45-degree angle with respect to the magnetic field produced by a magnetic target.

DETAILED DESCRIPTION OF THE INVENTION

Figure 1:
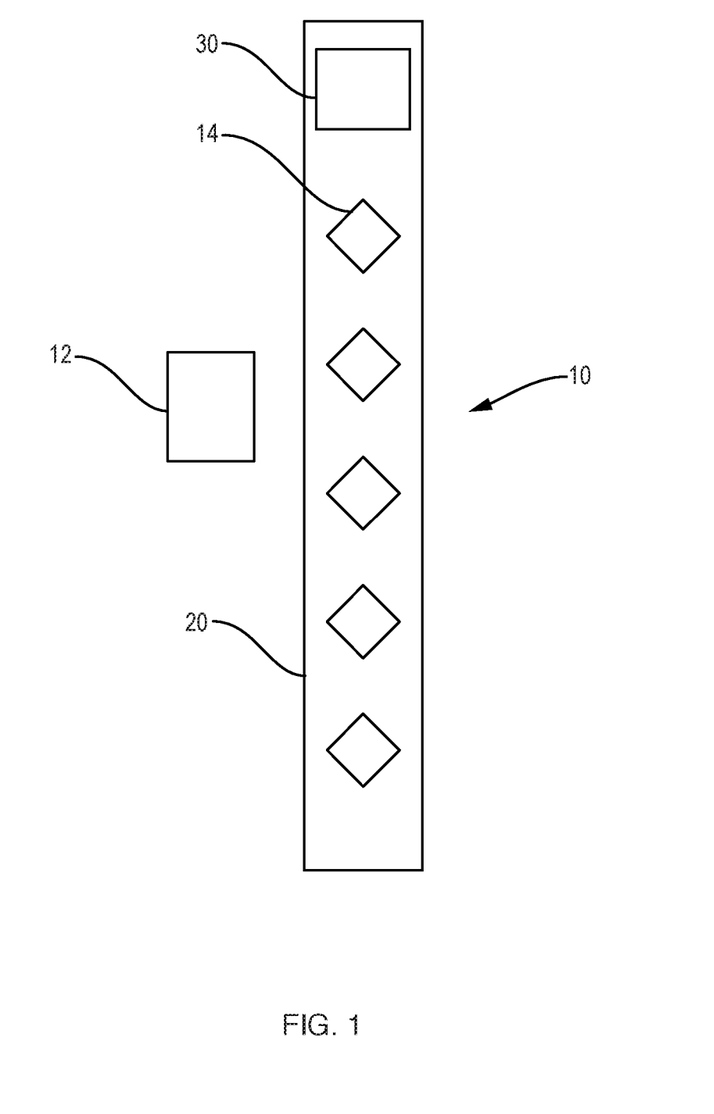
FIG. 1 is an illustration of the sensing apparatus in accordance with the invention.

As shown in FIG. 1, invention 10, magnetic position sensor, is shown determining the position of magnetic target 12. The magnetic field 36 (not shown) produced by the magnetic target 12 is measured by 3 adjacent 3D magnetic sensing elements 14 arranged in a linear array along PCB 20 (printed circuit board). Magnetic sensing element 14 is preferably model MLX90393 as made by Melexis Nev., but other 3-dimensional magnetic sensing devices having similar characteristics may be suitable.

Microprocessor 30 is also mounted to PCB 20. Microprocessor 30 is preferably Model ATtiny85 as made by Microchip Technology, but other microprocessors having similar characteristics may be suitable.

PCB 20 contains electrical traces (not shown) that facilitate electrical communication between the magnetic sensing elements 14 and the microprocessor 30. While microprocessor 30 is shown as attached to PCB 30 directly, this connection scheme is not essential. Microprocessor 30 could be mounted remotely from magnetic sensing elements 14 and PCB 30, if communication between them is facilitated by some other means.

Figure 2:
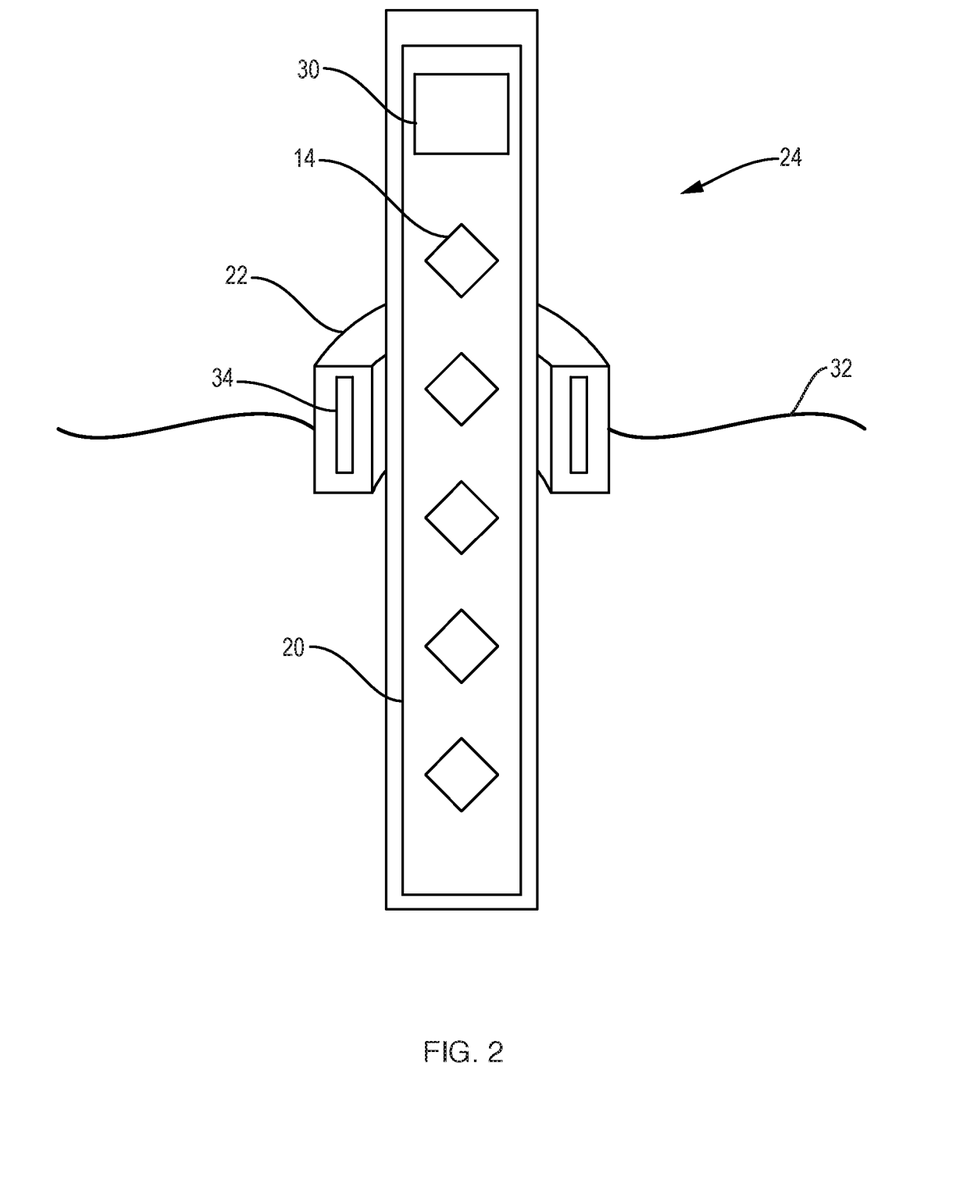
FIG. 2 is an illustration of one of the many uses of the inventions, that is, a liquid level sensor.

One useful application of invention 10 is shown in FIG. 2, where invention 10 is employed as a liquid level sensor 24. Here, invention 10 is used to determine the position of float 22 along the length of the liquid level sensor 24. The liquid level sensor 24 comprises a plastic or metal housing 28, inside which PCB 20 is located. Magnetic sensing elements 14 are mounted to PCB 20 in a linear array. Float 22 is designed such that it floats on the surface of a liquid 32.

Figure 3:
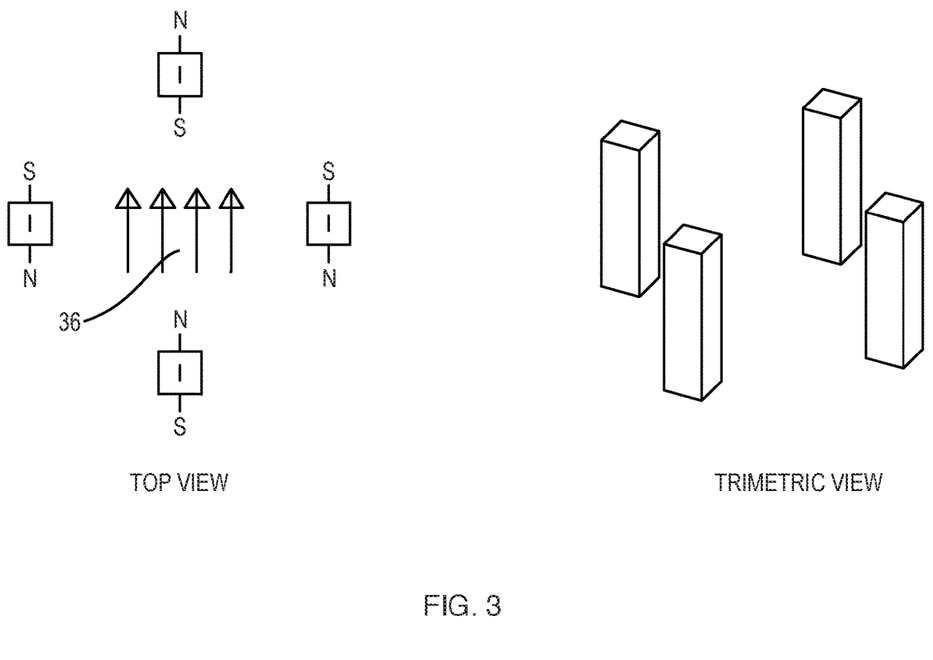
FIG. 3 is an illustration of a typical magnetic target, that is, a Halbach Mangle configuration of magnets.

Float 22 comprises a set of permanent magnets 34, which is an example of one potential magnetic target 12. This set of permanent magnets 34 is arranged in a Halbach Mangle configuration as shown in FIG. 3, such that a strong, unidirectional magnetic field 36 is present throughout the inner cylinder of float 22. A Halbach Mangle is a cylindrical arrangement of permanent magnets such that a strong, unidirectional magnetic field 36 is produced inside the cylinder. While a Halbach mangle configuration is shown here, any magnetic arrangement which produces a unidirectional magnetic field 36 inside the float 22 can be used.

Figure 4:
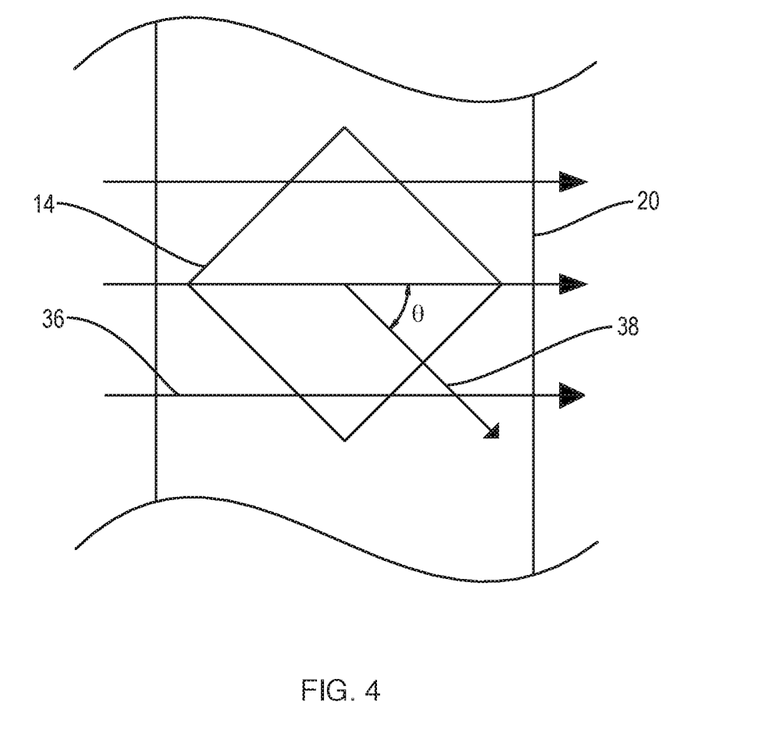
FIG. 4 is a detailed illustration of the preferred angular orientation of a sensing element.

FIG. 4 shows a detailed view of one magnetic sensing element 14 mounted to PCB 20. Magnetic sensing element 14 is mounted such that two sensing axes 38 (X and Y) are at a 45-degree angle ( ) relative to the direction of the magnetic field 36 produced by float 22 (not shown). In this configuration, the X and Y magnetic strength measurements produced by sensing element 14 are only a portion of the true unidirectional magnetic field 36 strength value.

To determine the true strength of the magnetic field orthogonal to the sensing element array, the following formula is used:

$$X_{true} = X(\cos 45°) + Y(\sin 45°)$$

$$Y_{true} = -X(\sin 45°) + Y(\cos 45°)$$

Using this offset angle arrangement allows for the utilization of a uniform magnetic field 36 strength which is beyond the maximum allowable measurement range of the magnetic sensing element 14 without saturating or damaging the sensing element 14. Thus, a stronger magnetic target field can be used, which effectively produces an invention 10 that is less susceptible to magnetic interference from outside magnetic fields. While a 45 degree offset angle is shown above, an offset angle from 0 to 45 degrees between the sensing element 14 and the magnetic target field can be used. When employed for use as a liquid level sensor, invention 10 requires the use of at least 2 magnetic sensing elements 14 arranged in a linear array, but the use of 3 or more is preferred. The axis of this array should be parallel with the direction of motion of float 22. The direction of this magnetic field is perpendicular to the magnetic sensing element array axis.

The unidirectional magnetic field 36 produced by the permanent magnets inside float 22 is measured by at least 2 of the magnetic sensing elements 14. These measurements are provided to microprocessor 30. These values are processed in the following manner to yield a numerical value that represents the physical position of float 22 along its axis of motion.

Figure 5:
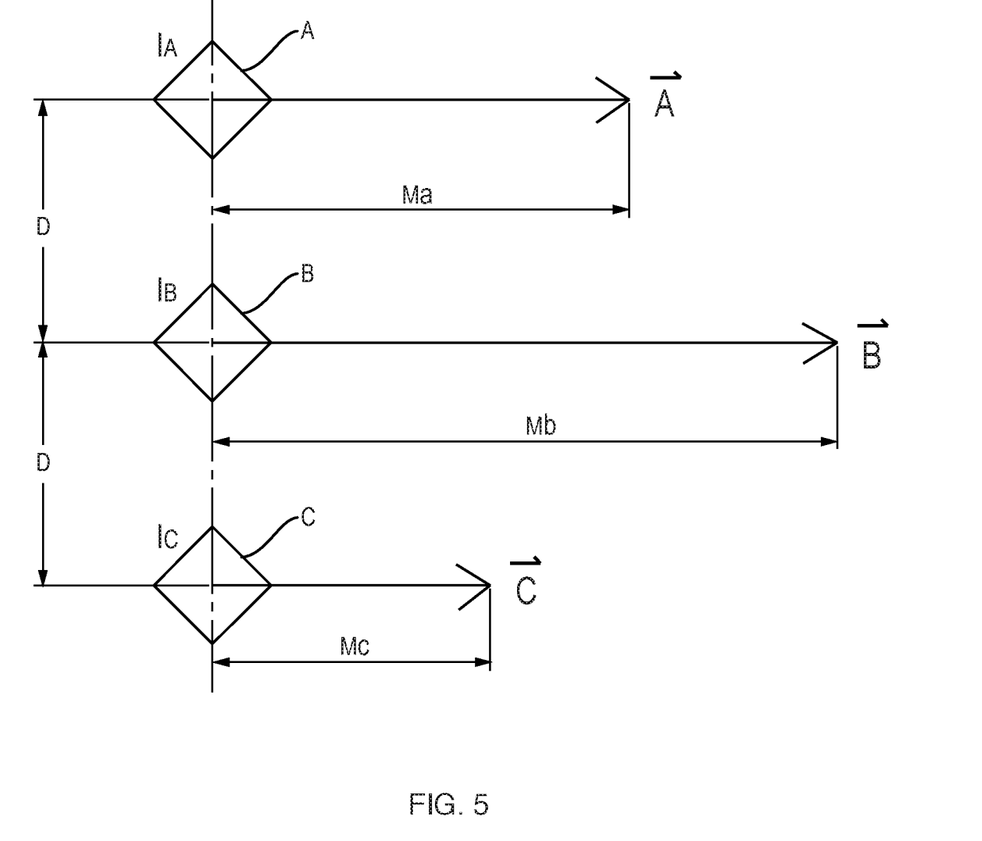
FIG. 5 is a graphical aid for the calculation method of determining the position/tracking of the magnetic target described in the specification in accordance with the invention.
Figure 6:
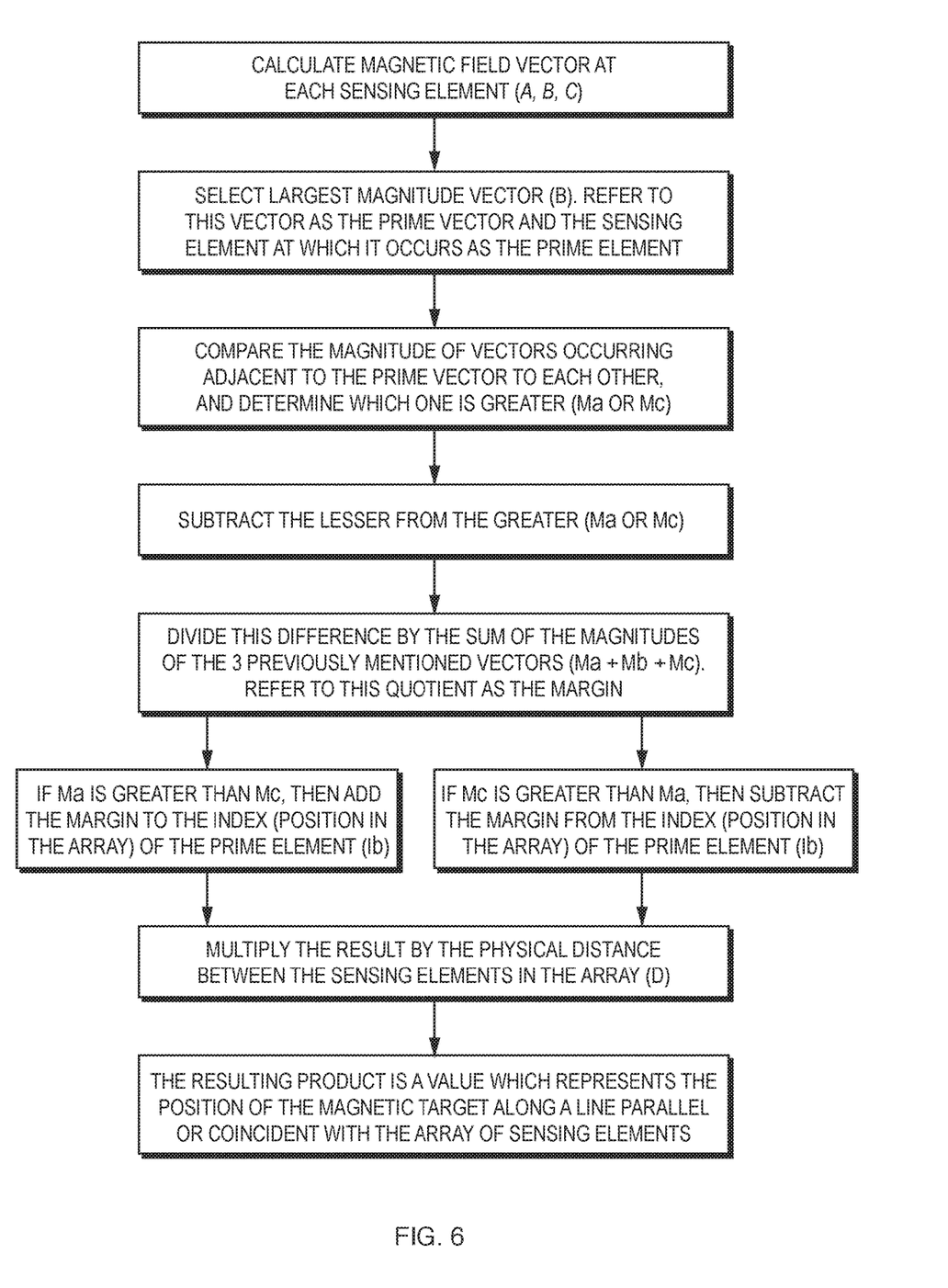
FIG. 6 is a flow chart showing the procedure that is followed to determine the position/tracking of a magnetic target in accordance with the invention.

Referring now to FIG. 5 as a graphical aid for the steps in the procedure below. FIG. 6 presents the same procedure in flow chart form.

1. First, the magnetic field measurement vector at each sensing element is calculated (A, B C).
2. Then, the largest magnitude vector is selected (B, in this case). This is referred to as the Prime Element.
3. Then, the magnitude of the vectors measured at the sensing elements adjacent to the Prime Element are calculated and compared to one another to determine which is greater ($M_A$, in this case).
4. Then, the magnitude of the lesser is subtracted from the magnitude of the greater ($M_A$-$M_C$).
5. Then, this difference is divided by the sum of the magnitudes of the 3 previously mentioned vectors ($M_A$+$M_B$+$M_C$). The result is referred to as the Margin.
6. If the greater of the adjacent vector magnitudes was measured at the sensing element above the Prime Element, then the Margin is added to the index of the Prime Element ($I_B$+Margin).
7. If the greater of the adjacent vector magnitudes was measured at the sensing element below the Prime Element, then the Margin is subtracted from the sensing element number of the Prime Element ($I_B$−Margin).
8. The result is then multiplied by the physical distance between the sensing elements in the array (D).

9. The result is a value that represents the position of the magnetic target along a line parallel or coincident with the array of sensing elements.

The above sequence assumes the presence of at least 3 magnetic sensing elements 14. In cases where only 2 elements are present, the same sequence is applied, however, the lesser of the 3 vectors is assumed to be zero.

Figure 7:
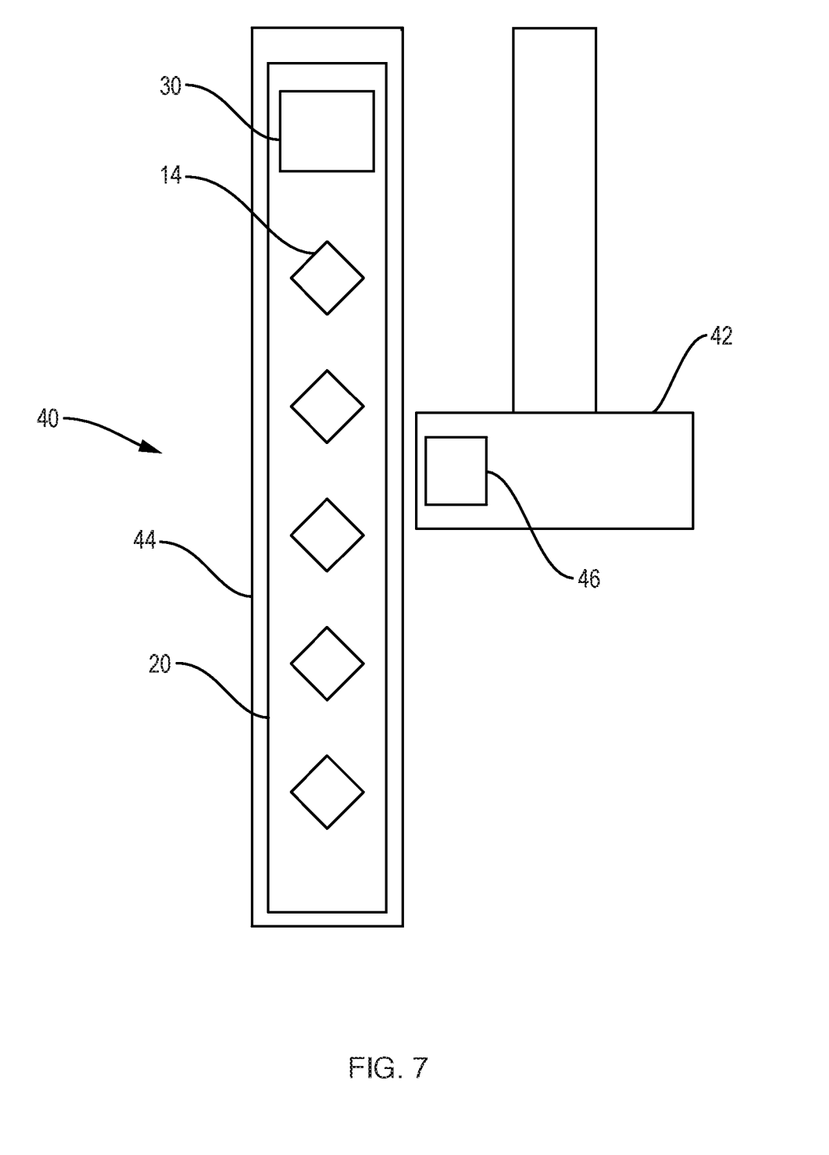
FIG. 7 is an illustration of an alternative apparatus for determining the position of a piston cylinder using a Halbach Mangle as the target in accordance with the invention.

Another useful application of invention 10 is shown in FIG. 7, where invention 10 is employed as a piston position sensor 40. In this application, invention 10 is used to determine the position of piston 42 along the length of the piston position sensor 40. The piston position sensor 40 comprises a plastic or metal housing 44, inside which PCB 20 is located. Magnetic sensing elements 14 are mounted to PCB 20 in a 1 dimensional array. In this case, the magnetic target 12 comprises a single magnet 46, sized and oriented such that it produces a unidirectional magnetic field 36 at piston position sensor 40. While a single magnet configuration is used here, any magnetic arrangement that produces a unidirectional magnetic field 36 at the piston position sensor 40 can be used.

Just as in the liquid level sensor application above, the magnetic sensing elements 14 are rotated by 45 degrees with respect to the direction of motion of the magnetic target 12. This orientation is depicted in FIG. 4, and measurement adjustments are made just as above.

Just as in the liquid level application, the unidirectional magnetic field 36 produced by the magnetic target 12 is measured by at least 2 of the magnetic sensing elements 14. These measurements are provided to microprocessor 30 and processed using the same method as described above to yield a value that represents the position of the piston 42 along the length of the piston position sensor 40.

Although the present invention has been described with reference to certain preferred embodiments thereof, other versions are readily apparent to those of ordinary skill in the preferred embodiments contained herein.

What is claimed is:

1. A magnetic sensing apparatus for tracking a magnetic target comprising:
   the magnetic target wherein said apparatus is independent of the rotation of said magnetic target; wherein said magnetic target comprises at least one element that is structured and arrayed to provide a uniform flux field zone;
   a plurality of magnetic field sensing devices; and
   a microprocessor wherein said apparatus calculates the position of said magnetic target within the predetermined range of said apparatus using said uniform flux field zone.

2. The magnetic sensing apparatus for tracking a magnetic target of claim 1 that provides increased resolution and increased immunity from external magnetic interference.

3. The magnetic sensing apparatus for tracking a magnetic target of claim 1 wherein said magnetic target comprises a single permanent magnet.

4. The magnetic sensing apparatus for tracking a magnetic target of claim 1 wherein said magnetic target comprises at least two diametrically opposed permanent magnets.

5. The magnetic sensing apparatus for tracking a magnetic target of claim 1 wherein said magnetic target comprises at least four magnets arranged in a Halbach mangle.

6. The magnetic sensing apparatus for tracking a magnetic target of claim 1 wherein said magnetic target comprises at least four magnets diametrically opposed and stacked in groups of at least two magnets.

7. The magnetic sensing apparatus for tracking a magnetic target of claim 1 wherein said plurality of magnetic field sensing devices comprises 3D magnetic sensing devices arranged in a 45-degree angle with respect to the magnetic field provided by said magnetic target.

8. The magnetic sensing apparatus for tracking a magnetic target of claim 1 wherein said magnetic target comprises at least one electromagnet.

9. The magnetic sensing apparatus for tracking a magnetic target of claim 1 wherein said magnetic target comprises at least one magnetic coil.

10. The magnetic sensing apparatus of claim 1 wherein said magnetic sensing apparatus is used as a piston position sensor further comprising:
    a housing containing said plurality of magnetic field sensing devices;
    a piston adapted to be moved along said housing; said piston associated with said magnetic target;
    wherein said apparatus uses said microprocessor to determine the position of said piston along said housing.

11. The magnetic sensing apparatus of claim 1 used as a liquid level further comprising:
    a float designed to float on the surface of a liquid wherein said magnetic target is associated with said float such that the liquid level of said surface can be determined.

12. A magnetic sensing apparatus for tracking a magnetic target comprising:
    the magnetic target wherein said apparatus is independent of the rotation of said magnetic target; wherein said magnetic target comprises at least one element that is structured and arrayed to provide a uniform flux field zone;
    a plurality of magnetic field sensing devices;
    a microprocessor wherein said apparatus calculates the position of said target within the predetermined range of said apparatus using said uniform flux field zone
    wherein the target comprises at least two diametrically opposed permanent magnets, at least four magnets arranged in a Halbach mangle, or at least four magnets diametrically opposed and stacked in groups of at least two magnets.

13. A magnetic sensing apparatus for tracking a magnetic target comprising:
    the magnetic target wherein said apparatus is independent of the rotation of said magnetic target; wherein said magnetic target comprises at least one element that is structured and arrayed to provide a uniform flux field zone;
    a plurality of magnetic field sensing devices;
    a microprocessor wherein said apparatus calculates the position of said target within the predetermined range of said apparatus using said uniform flux field zone
    wherein said magnetic target comprises at least one of an electromagnet or a magnetic coil.

* * * * *